US010956395B2

(12) United States Patent
Dai et al.

(10) Patent No.: US 10,956,395 B2
(45) Date of Patent: Mar. 23, 2021

(54) ASSOCIATION ANALYSIS METHOD AND APPARATUS

(71) Applicant: ALIBABA GROUP HOLDING LIMITED, Grand Cayman (KY)

(72) Inventors: Bin Dai, Hangzhou (CN); Xu Yang, Hangzhou (CN); Xiaoyan Jiang, Hangzhou (CN); Ning Cai, Hangzhou (CN); Shaomeng Wang, Hangzhou (CN)

(73) Assignee: ALIBABA GROUP HOLDING LIMITED, George Town (KY)

( * ) Notice: Subject to any disclaimer, the term of this patent is extended or adjusted under 35 U.S.C. 154(b) by 183 days.

(21) Appl. No.: 16/107,927

(22) Filed: Aug. 21, 2018

(65) Prior Publication Data

US 2019/0102383 A1    Apr. 4, 2019

Related U.S. Application Data

(63) Continuation of application No. PCT/CN2017/073135, filed on Feb. 9, 2017.

(30) Foreign Application Priority Data

Feb. 22, 2016 (CN) .......................... 201610096728.8

(51) Int. Cl.
*G06F 16/23*        (2019.01)
*G06F 17/18*        (2006.01)
(Continued)

(52) U.S. Cl.
CPC .............. *G06F 16/23* (2019.01); *G06F 17/15* (2013.01); *G06F 17/18* (2013.01); *G06Q 30/0201* (2013.01); *G06F 2216/03* (2013.01)

(58) Field of Classification Search
CPC .......... G06F 16/23; G06F 17/15; G06F 17/18; G06F 2216/03; G06Q 30/0201
(Continued)

(56) References Cited

U.S. PATENT DOCUMENTS 6,567,936 B1 * 5/2003 Yang ..................... G06F 16/284
714/37
2002/0198877 A1 * 12/2002 Wolff ................... G06F 16/2465
(Continued)

FOREIGN PATENT DOCUMENTS

CN        102541934 A    7/2012
CN        103914528 A    7/2014
(Continued)

OTHER PUBLICATIONS

Borgelt et al., "Frequent Item Set Mining", WIREs Data Mining Knowl Discov 2012, 2: 437-456 doi: 10.1002/widm.1074. (Year: 2012).*

(Continued)

*Primary Examiner* — Evan Aspinwall
(74) *Attorney, Agent, or Firm* — Finnegan, Henderson, Farabow, Garrett & Dunner, LLP

(57) ABSTRACT

There is provided an association analysis method and apparatus. An original database is divided into projection databases, each not contributing to a support count of a frequent item set of another. The projection databases are used for sequential-pattern association analysis performed respectively by nodes corresponding to the projection databases. Local frequent item sets and corresponding support counts obtained by the nodes are combined. Since an established projection database does not contribute a support count of a frequent item set of another projection database, different nodes can perform association mining, including pruning, on different projection databases respectively.

17 Claims, 6 Drawing Sheets

(51) Int. Cl.
*G06F 17/15* (2006.01)
*G06Q 30/02* (2012.01)

(58) Field of Classification Search
USPC .......................................... 707/736
See application file for complete search history.

(56) References Cited

U.S. PATENT DOCUMENTS

| | | | |
|---|---|---|---|
| 2006/0015474 A1* | 1/2006 | Aggarwal | G06F 16/2465 |
| 2010/0114665 A1* | 5/2010 | Stengard | G06F 16/214 |
| | | | 705/7.33 |
| 2010/0131506 A1* | 5/2010 | Shintani | G06Q 30/02 |
| | | | 707/737 |
| 2011/0289590 A1* | 11/2011 | Miettinen | G06Q 30/02 |
| | | | 726/26 |
| 2014/0032514 A1 | 1/2014 | Li et al. | |
| 2016/0092515 A1* | 3/2016 | Levitan | G06F 16/148 |
| | | | 707/776 |

FOREIGN PATENT DOCUMENTS

| | | |
|---|---|---|
| CN | 104834751 A | 8/2015 |
| WO | WO 2017/143908 A1 | 8/2017 |

OTHER PUBLICATIONS

SIPO International Search Report issued in International Application No. PCT/CN2017/073135 dated Apr. 26, 2017, 4 pages.
Gaoshasa, "Association Rules and Sequential Patterns Mining for Spatio-Temporal K-Anonymous Sets Data," Full-Text Database Information Technology Series, No. 6, pp. 30-37, Jun. 2013.
First Chinese Search Report issued in corresponding Chinese Application No. 201610096728.8 dated Feb. 26, 2020 (1 page).
First Chinese Office Action issued in Chinese Application No. 201610096728.8 dated Mar. 5, 2020, 28 pages.

* cited by examiner

ASSOCIATION ANALYSIS METHOD AND APPARATUS

CROSS-REFERENCE TO RELATED APPLICATION

This application claims priority to International Application No. PCT/CN2017/073135, filed on Feb. 9, 2017, which claims priority to and the benefits of priority to Chinese Patent Application No. 201610096728.8, filed on Feb. 22, 2016, both of which are incorporated herein by reference in their entireties.

TECHNICAL FIELD

The present disclosure relates to computer technologies, and in particular, to association analysis methods and apparatus.

BACKGROUND

Association analysis is an analytical technology in data mining. It is mainly used to find an association between items based on a large amount of data. A typical example of association analysis is shopping basket analysis. The association analysis is performed based on shopping data to find a correlation between different products that customers put into shopping baskets. Then, the association obtained from the association analysis reflects purchasing habits of the customers. Retailers can develop marketing strategies by understanding the purchasing habits.

Sequential-pattern association analysis is different from association analysis of other patterns. In the sequential pattern, the time of occurrence of the items is also taken into account, so that the items are sequential. The sequential-pattern association analysis is usually used to analyze a super large-scale database. Therefore, it is not suitable to use a single machine for data processing due to the heavy computational load. Conventionally, it is common to simply fragment data in a database and perform separate association analysis on each piece of fragmented data at each node to obtain candidate frequent item sets and their support counts. The candidate frequent item sets and the support counts are merged to obtain global support counts of the candidate frequent item sets. Then, global frequent item sets are obtained after pruning according to a preset screening condition.

However, data expansion occurs in the process of performing association analysis to generate a candidate frequent item set. As a result, the data volume of the candidate frequent item sets is exponentially more than that of the fragmented data. Therefore, when the candidate frequent item sets and their support counts generated by the nodes are combined in order to perform a merge operation, an excessively large volume of data is transmitted, resulting in low execution efficiency.

SUMMARY

The present disclosure provides an association analysis method and apparatus to solve the technical problem in the conventional art that the execution efficiency is low because an excessively large volume of data is transmitted during data summarization in parallel association analysis.

In accordance to some embodiments of the disclosure, an association analysis method is provided. The method includes dividing an original database into projection databases. One of the projection databases does not contribute to a support count of a frequent item set of one another of the projection databases. The projection databases are used for sequential-pattern association analysis performed respectively by nodes corresponding to the projection databases to obtain local frequent item sets and corresponding support counts. The method further includes combining the local frequent item sets and the corresponding support counts obtained by the nodes through association analysis to obtain global frequent item sets and corresponding support counts.

In accordance to some embodiments of the disclosure, an association analysis apparatus is provided. The association analysis apparatus includes one or more memories configured to store executable program code and one or more processors configured to read the executable program code stored in the one or more memories to cause the association analysis apparatus to perform the following. An original database is divided into projection databases. One of the projection databases does not contribute to a support count of a frequent item set of another of the projection databases. The projection databases are used for sequential-pattern association analysis performed respectively by nodes corresponding to the projection databases to obtain local frequent item sets and corresponding support counts. The local frequent item sets and the corresponding support counts obtained by the nodes through the association analysis are combined to obtain global frequent item sets and corresponding support counts.

In accordance to some embodiments of the disclosure, a non-transitory computer-readable storage medium storing a set of instructions that is executable by one or more processors of one or more electronic devices is provided. Upon execution of the set of instructions by the one or more processors, the one or more electronic devices are caused to perform a method including the following. An original database is divided into projection databases. One of the projection databases does not contribute to a support count of a frequent item set of another of the projection databases. The projection databases are used for sequential-pattern association analysis performed respectively by nodes corresponding to the projection databases to obtain local frequent item sets and corresponding support counts. The local frequent item sets and the corresponding support counts obtained by the nodes through the association analysis are combined to obtain global frequent item sets and corresponding support counts.

According to the association analysis method and apparatus provided in some embodiments of the present disclosure, an original database is divided into projection databases, one of the projection databases not contributing to a support count of a frequent item set of another of the projection databases. Nodes perform sequential-pattern association analysis on corresponding projection databases respectively. Then, local frequent item sets and corresponding support counts obtained by the nodes are combined. Since an established projection database does not contribute to a support count of a frequent item set of another projection database, different nodes can perform association mining, including pruning, on different projection databases respectively. The nodes obtain local frequent item sets with a relatively small data volume respectively, avoiding the situation in the conventional art where it may be necessary to transmit local candidate frequent item sets with a relatively large data volume obtained by nodes without pruning. As such, the transmission overheads are reduced and the efficiency is improved.

BRIEF DESCRIPTION OF THE DRAWINGS

By reading the detailed description of the preferred embodiments below, those of ordinary skill in the art will become clearer about various other advantages and benefits. The accompanying drawings are merely intended for illustrating preferred embodiments, and are not considered as limitations on the present invention. Moreover, identical reference symbols are used to represent identical components in all the accompanying drawings. In the drawings.

DETAILED DESCRIPTION

Figure 1:
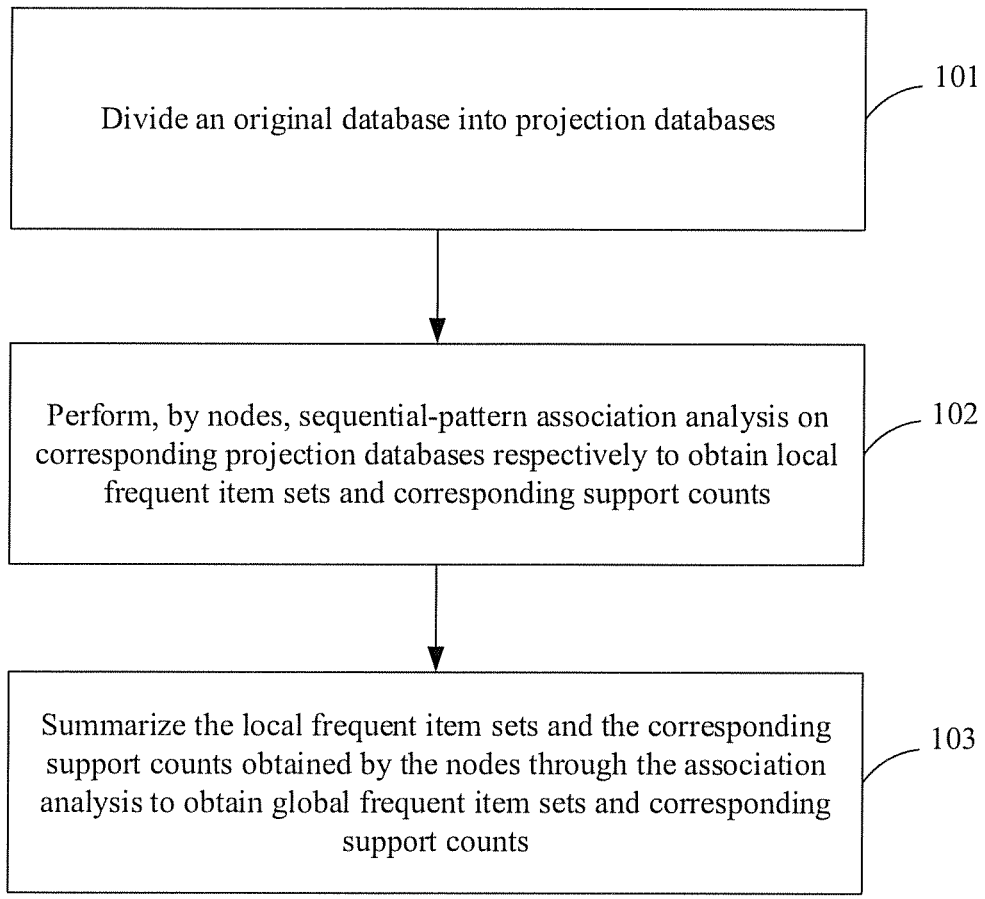
FIG. 1 is a schematic flowchart of an association analysis method according to some embodiments of the present disclosure.

Exemplary embodiments of the present disclosure will be described in more detail with reference to the accompanying drawings. Although the exemplary embodiments of the disclosure are illustrated in the accompanying drawings, it should be understood that the present disclosure can be implemented in various forms and should not be restricted by the embodiments described here. Instead, these embodiments are provided to enable a more thorough understanding of the present disclosure and to fully convey the scope of the present disclosure to those skilled in the art.

Various transactions are usually recorded in a database on which association analysis is to be performed. Each transaction includes various items, and each item includes at least one element. An element is used to indicate an operation object. An item is used to indicate operation objects that are operated by the same user at the same time. An operation object operated by a user at different moments can be identified with a transaction. As association analysis of a sequential pattern may need to take the time sequence into account, items included in each transaction take place sequentially in a particular order. Such sequential items can be referred to as a sequence. Therefore, it can also be said that a transaction is represented by a sequence.

For example, a transaction in a database is a sequence of abc, abc, ac, d, and cf. The sequence can be used to indicate that a user bought products a, b, and c on the first day, bought products a, b, and c on the second day, and bought products a and c on the third day respectively. All products bought on each day are referred to as an item, and each product is referred to as an element.

Based on analysis of the association analysis method in the conventional art, it can be found that in the conventional art, an excessively large volume of data is transmitted when candidate frequent item sets and their support counts generated by nodes are combined in order to perform a merge operation. This is mainly because the nodes do not perform a pruning step locally. Based on this, the original data is only simply fragmented in the conventional art, and each piece of fragmented data possibly contributes to the support count of a certain frequent item set. Thus, it is impossible to perform a pruning step locally. Therefore, in order to perform pruning locally at a node, it is necessary to divide original data into databases containing mutually exclusive supports. Thus, transmitting the candidate frequent item sets and their support counts can be avoided. Based on such a concept, an association analysis method is provided herein.

To facilitate understanding of the association analysis method herein, before specific embodiments are described, technical terms involved in the embodiments are explained as follows.

Sequential-pattern association analysis includes the following: A database is given, wherein the database includes various transactions, each transaction is represented by a sequence, and each sequence is formed of sequential items, which form a particular order with one another. Sequential pattern mining includes identifying all sub-sequences having frequencies of occurrence in the database are not lower than a support count threshold, and using these sub-sequences as frequent item sets. The operation of identifying these frequent item sets from the database is sequential-pattern association analysis.

An item set includes a set formed by orderly arranged items that appear in a transaction in a database.

A length of the item set is used to indicate the length of a sequence of the item set, and the value of the length is equal to the number of items included in the item set.

A support count includes a frequency of occurrence of an item set in a database. If a transaction includes the item set, the frequency of occurrence is denoted as once. Thus, the support count is equal to the number of transactions in the database that include a certain item set.

Frequent item sets include all item sets having frequencies of occurrence that are not less than a support count threshold in a database.

A projection database includes a database obtained by performing a projection operation on an original database. Specifically, a projection database of a is suffixes, with respect to a, of all sequences in S that take a as the prefix.

The meanings of the technical terms are briefly explained here. The above technical terms will be further explained subsequently in combination with specific embodiments.

The association analysis method and apparatus provided in the embodiments of the present disclosure are described in the following in detail with reference to the accompanying drawings.

FIG. 1 is a schematic flowchart of an association analysis method according to some embodiments of the present disclosure. As shown in FIG. 1, the method includes steps 101-103.

In step 101, an original database is divided into projection databases. The projection databases do not contribute to a support count of a frequent item set of another projection database. The support count refers to the number of transactions in the database that include a certain item set. That the projection databases do not contribute to a support count of a frequent item set of another projection database means that a frequent item set obtained by sequential pattern mining based on one projection database does not appear in another projection database. Thus, other projection databases do not increase the support count of the frequent item set. Therefore, other projection databases do not contribute to a support count of a frequent item set of a particular projection database.

Specifically, first of all, at least two initial item sets are obtained. The initial item sets are item sets obtained by performing association analysis on the original database for use in constructing a projection database. No inclusion relation exists between any two initial item sets in the at least two initial item sets. Specifically, the at least two item sets can be obtained by performing calculation on the original database by using an association analysis algorithm. The at least two item sets can be of the same length or of different lengths. The at least two item sets can be frequent item sets obtained after a pruning step is performed, or they can be candidate frequent item sets obtained without performing a pruning step. The variations are not limiting in this embodiment.

Next, the initial item sets are taken as prefixes to establish projection databases of the prefixes. Specifically, by taking the initial item sets as prefixes, suffixes corresponding to the prefixes are searched for in the transactions of the original database. Then, the suffixes of the transactions are combined to form projection databases of the prefixes. In order to obtain a suffix, a sequence behind a position where the prefix appears for the first time is searched for in each transaction. If the last element of the prefix has the same time sequence as the first element in the found sequence, "_" and the found sequence are taken as a suffix. Otherwise, the found sequence is directly taken as a suffix.

As there is no inclusion relation between any two initial item sets, a projection databases established accordingly do not contribute to a support count of a frequent item set of another projection database. Different nodes can perform association mining, including pruning, on different projection databases respectively. The nodes obtain local frequent item sets with a relatively small data volume. The situation in the conventional art where it is necessary to transmit local candidate frequent item sets with a relatively large data volume obtained by nodes without pruning can be avoided. As such, the transmission overheads are saved and the efficiency is improved.

It is noted that, the inclusion relation defined here is an inclusion relation of the prefixes. In other words, if one initial item set is a prefix of another initial item set, there is an inclusion relation. The following provides an example.

For <a, b> and <a, c, b>, <a, b> is not a prefix of <a, c, b>. Therefore, there is no inclusion relation between <a, b> and <a, c, b>.

For <a, b> and <a>, <a> is a prefix of <a, b>. Therefore, there is an inclusion relation between <a, b> and <a>.

In one possible implementation, K_frequent item sets of the original database, i.e., frequent item sets each including K items, can be calculated, wherein K is a positive integer, and 1≤K<N, N being the number of elements included in the original database. The K_frequent item sets are taken as the initial item sets.

In another possible implementation, after K_frequent item sets of the original database are calculated, the K_frequent item sets can further be screened according to a preset support count threshold to retain K_frequent item sets having support counts being greater than the support count threshold. The screened K_frequent item sets are taken as the initial item sets. The screening step reasonably reduces the data volume for subsequent processing, and reduces the computing load of the nodes in constructing projection databases and performing association analysis based on the projection databases. At the same time, screening also reduces the total amount of data transmitted during subsequent combining of the local frequent item sets obtained by the nodes through association analysis.

In step 102, nodes perform sequential-pattern association analysis on corresponding projection databases respectively to obtain local frequent item sets and corresponding support counts. Specifically, a node is allocated to each projection database. For example, nodes having load capacities matching data volumes of the projection databases can be allocated to the projection databases. Then, the nodes perform sequential-pattern association analysis in parallel by using a preset association analysis algorithm, for example, a Generalized Sequential Pattern (GSP) algorithm. Specifically, the nodes scan, merge, and prune the projection databases to obtain local frequent item sets and corresponding support counts. Each node can only obtain some of the frequent item sets of the original database. In order to be distinguished from all the frequent item sets of the original database, the frequent item sets obtained by each node are referred to as local frequent item sets, and all the frequent item sets of the original database are referred to as global frequent item sets. In addition, it is noted that the nodes here run on a single machine, and the single machine can be a physical machine or a virtual machine, but this is not limiting in these embodiments.

By allocating nodes having load capacities matching data volumes of the projection databases to the projection databases, a situation that some nodes are loaded heavily while some other nodes are idle is avoided. Thus, existing nodes can be utilized more reasonably and efficiently, accelerating the speed of association analysis and improving the efficiency of association analysis.

In step 103, the local frequent item sets and the corresponding support counts obtained by the nodes through association analysis are combined to obtain global frequent item sets and corresponding support counts. Specifically, it may be only necessary to combine the local frequent item sets and the corresponding support counts obtained by the nodes through association analysis into one file. As such, global frequent item sets and corresponding support counts are recorded in the file, and it is unnecessary to perform the steps of merging and pruning.

In these embodiments, an original database is divided into projection databases, each not contributing to a support count of a frequent item set of another. Nodes perform sequential-pattern association analysis on corresponding projection databases respectively. Then, local frequent item sets and corresponding support counts obtained by the nodes are combined. Since an established projection database does not contribute to a support count of a frequent item set of another, different nodes can perform association mining, including pruning, on different projection databases respectively. The nodes obtain local frequent item sets with a relatively small data volume, avoiding the situation in the conventional art where it is necessary to transmit local candidate frequent item sets with a relatively large data volume obtained by nodes without pruning. As such, the transmission overheads are reduced and the efficiency is improved.

Figure 2:
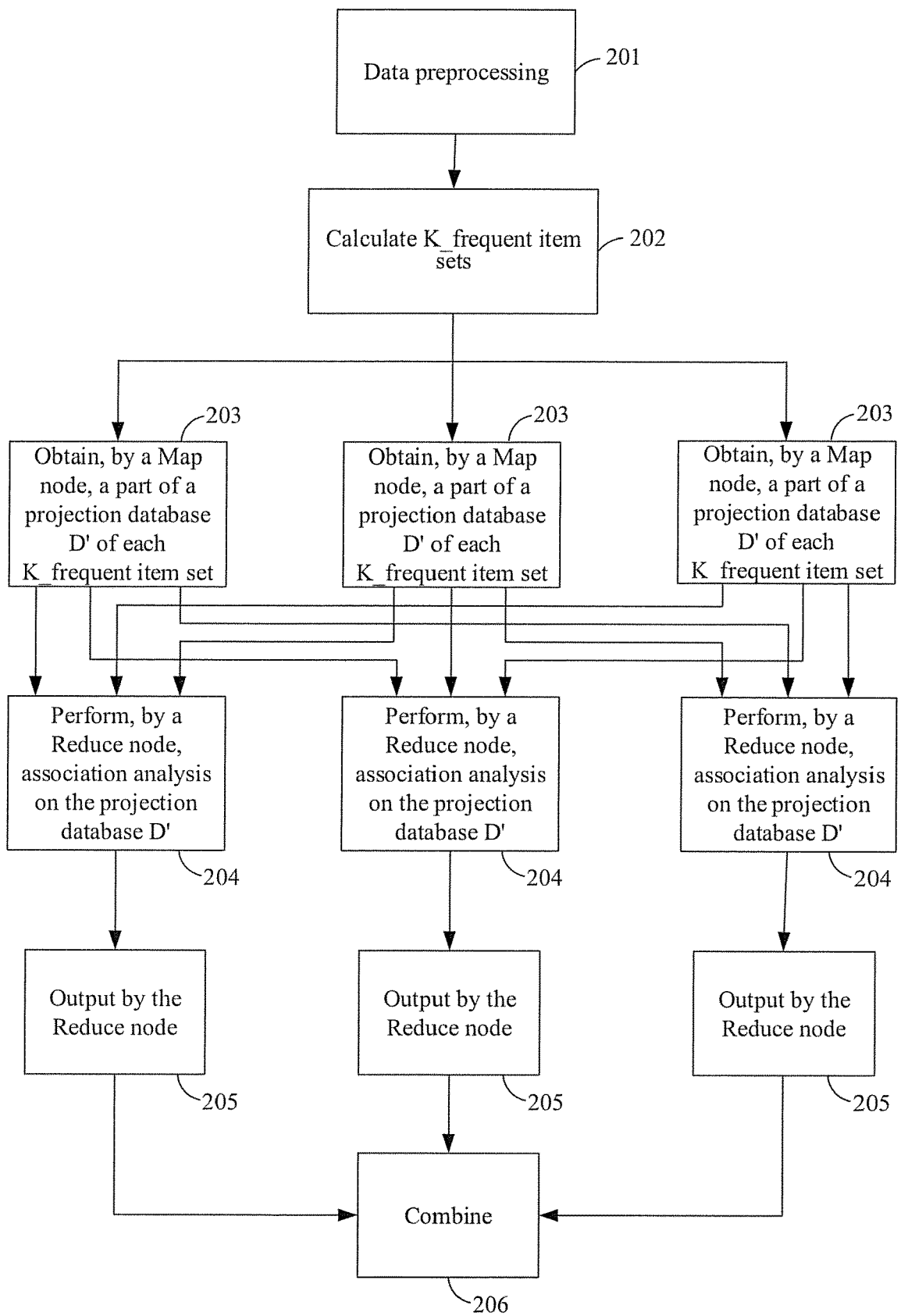
FIG. 2 is a schematic flowchart of an association analysis method according to some embodiments of the present disclosure.

FIG. 2 is a schematic flowchart of an association analysis method according to some embodiments of the present disclosure. The association analysis method according to these embodiments can be performed by software. The software can run on an Open Data Processing Service (ODPS) platform. The method according to these embodiments can run under the framework of MapReduce software and can be performed by multiple nodes. The framework of MapReduce software includes one master node and multiple slave nodes (workers). The master node can allocate a Map operation (to map a set of key-value pairs into a new set of key-value pairs) or a Reduce operation (to ensure that each of all the mapped key-value pairs shares the same key group) to each slave node. The slave node to which the Map operation is allocated can also be referred to as a Map node, and the slave node to which the Reduce operation is allocated can also be referred to as a Reduce node. Each node can run on a physical machine or a virtual machine, but this is not limiting in these embodiments. As shown in FIG. 2, the method includes steps 201-206.

In step 201, a master node schedules slave nodes to cause the slave nodes to perform data preprocessing. Specifically, the master node takes data preprocessing as a MapReduce task, and schedules the slave nodes to execute the task to perform a data serialization operation for original data. Specifically, different operation objects, which are operated by each user and recorded in original data, are respectively identified with a sequence of numbers or letters according to a mapping table. The operation objects operated by a same user are sorted according to operation time points.

In step 202, the slave nodes are scheduled by the master node to calculate K_frequent item sets based on an original database D, and each K_frequent item set is allocated to a Map node for processing. It is noted that, $1 \leq K < N$, wherein N is the number of elements included in the original database.

In step 203, each Map node traverses one piece of fragmented data in the original database D according to each K_frequent item set to obtain a part of a projection database D' of each K_frequent item set. Specifically, each Map node divides data in one piece of fragmented data of the original database D into two parts, i.e., a prefix part and a suffix part, according to each of the K_frequent item sets. A projection database D' formed by suffix parts corresponding to a certain K_frequent item set obtained by all Map nodes is the projection database D' of the K_frequent item set. Specifically, in each transaction, a sequence behind a position where the prefix appears for the first time is searched for by taking the K_frequent item set as a prefix. If the last element of the prefix has the same time sequence as the first element in the found sequence, "_" and the found sequence are taken as a suffix. Otherwise, the found sequence is directly taken as a suffix. The projection database D' of the K_frequent item set formed by suffixes in the transactions is constructed.

There can be multiple Map nodes. Each Map node acquires one piece of fragmented data in the original database D. The fragmentation here is simple data fragmentation. Each Map node takes the K_frequent item sets as keys, traverses transactions in the fragmented data to obtain key values corresponding to the keys or K_frequent item sets, and outputs the obtained key values to a Reduce node corresponding to each K_frequent item set. Thus, data received by the Reduce node corresponding to the K_frequent item set from all the Map nodes makes up the projection database D' of the K_frequent item set. For example, if there are m K_frequent item sets and three pieces of fragmented data, Map node 1 divides the first piece of fragmented data in the original database D into two parts, i.e., prefixes and suffixes, based on the m K_frequent item sets. Map node 2 divides the second piece of fragmented data in the original database D into two parts, i.e., prefixes and suffixes, based on the m K_frequent item sets. Map node 3 divides the third piece of fragmented data in the original database D into two parts, i.e., prefixes and suffixes, based on the in K_frequent item sets.

It is noted that, "_" in the projection database D' is used to represent a prefix itself. The prefix is an element of the first item in the suffix. The first item further includes other elements in addition to the prefix.

It can be seen that frequent item sets generated by transactions with the same prefix also have the same prefix. Therefore, in the transactions, sequences behind a position where the same prefix appears for the first time are merged into a projection database. Frequent item sets obtained by different projection databases through association analysis do not include repeated frequent item sets, and thus do not contribute to support counts of other frequent item sets. Thus, different Reduce nodes can perform association analysis mining separately for different projection databases, and the process including pruning candidate frequent item sets to obtain frequent item sets is also performed at a local Reduce node. Combining the candidate frequent item sets and their local support counts can be avoided.

Thus, the method according to these embodiments is different from a conventional situation where candidate frequent item sets obtained by different Reduce nodes through association analysis include repeated frequent item sets. Therefore, it is not necessary to combine the candidate frequent item sets obtained by different Reduce nodes through association analysis and their local support counts before performing merging and pruning to finally obtain global frequent item sets. Therefore, the method in these embodiments can effectively avoid combining the candidate frequent item sets and their local support counts. The data volume of the candidate frequent item sets of each Reduce node is often exponentially more than that of the fragmented data of the Reduce node. As a result, the method in these embodiments greatly reduces the data volume of data transmission.

In step 204, each Reduce node receives a part of a projection database D' of a corresponding K_frequent item set from all the Map nodes to obtain the projection database D' of the corresponding K_frequent item set, and performs parallel association analysis on the projection database D'. Specifically, the framework of MapReduce software includes multiple Reduce nodes. Each Reduce node corresponds to one K_frequent item set. Each Reduce node receives a part of a projection database D' of a corresponding K_frequent item set from all the Map nodes to obtain the projection database D' of the corresponding K_frequent item set. Each Reduce node then performs association analysis on the projection database D' of the K_frequent item set to obtain frequent item sets and their support counts.

For example, Reduce node 1 performs association analysis based on a projection database $D'_1$, Reduce node 2 performs association analysis based on a projection database $D'_2$, . . . , and Reduce node m performs association analysis based on a projection database $D'_m$.

Each Reduce node can perform association analysis by using a GSP algorithm to obtain the above frequent item sets and their support counts. Other association analysis algorithms can also be used without affecting the advantages of the method provided in these embodiments. In these embodiments, the GSP algorithm only serves as an example to describe the method provided in these embodiments. In the GSP algorithm, a sequence with a length of i is obtained by scanning a projection database D' to serve as an initial sequence. A sequence with a length of i+1 is generated according to the initial sequence with the length of i and based on merging and pruning operations. The generated sequence is used as a new initial sequence to repeat scanning, merging, and pruning operations iteratively, until no new sequence is generated. The obtained sequences are used to represent candidate frequent item sets. Support counts of the candidate frequent item sets are calculated based on the projection database D', and then screening is performed according to a preset screening condition to obtain frequent item sets.

It is noted that the initial value of i can be equal to a sequence length of the frequent item set that serves as a prefix.

Specifically, GSP algorithm pseudocodes shown as follows can be used:

```
Algorithm GSP (S)
1       C1←init-pass(S);
2       F1←{<{f}>|f∈ C1, f. count/n≥minsup};
3       for(k=2; Fk−1≠Ø; k++)do
4           Ck←candidate-gen-SPM(Fk−1);
5           for each data sequence s ∈ S do
6               for each candidate c ∈ Ck do
7                   if c is contained in s then
8                       c.count++
9                   end
10              end
11          Fk←{c ∈ Ck | c.count/n≥minsup}
12      end
13      return∪k Fk;
``` wherein the algorithm flow of candidate-gen-SPM(Fk−1) is described as follows.

1. Merge: the generated k−1_candidate frequent item sets Fk−1 are merged to generate k_candidate frequent item sets Fk.

Specifically, when k=2, for sequences s1 and s2 of two 1_candidate frequent item sets F1, items of s2 are merged to s1 in two manners: serving as a part of the items of s1 and serving as an individual item. That is, <a> and <b> are merged, and candidate frequent item sets thus generated are <(a, b)>, <a, a>, <a, b>, <b, a> and <b, b>.

It is noted that <(a, b)> indicates that a and b occur at (or substantially at) the same time, and <a, b> indicates a occurs first and then b occurs.

When k is a positive integer greater than 2 and for the two sequences s1 and s2, if a remaining string obtained after the first item of s1 is removed is the same as a remaining string obtained after the last item of s2 is removed, s1 and s2 can be merged. A candidate sequence is obtained by appending the last item of s2 to the end of s1. There are two ways to append in two different situations here.

If the last item of s2 is an individual element, the item is appended to the end of s1 in the form as an individual item. Otherwise, the last item of s2 is merged into s1 as a part of the last item of s1.

2. Prune: k_candidate frequent item sets Fk obtained by merging are pruned to obtain k_frequent item sets Fk.

Specifically, pruning means to remove a k_candidate frequent item set Fk if any subset of the k_candidate frequent item set Fk is non-frequent.

The Reduce nodes obtain results of association analysis, that is, frequent item sets and their support counts, based on the steps of scanning, merging, and pruning and the step of screening.

In step 205, the Reduce nodes output results of the association analysis. Specifically, each node can directly output a result of the association analysis and can also deserialize the result according to a mapping table and then output a deserialized result of the association analysis.

In step 206, the results of the association analysis output by the Reduce nodes are combined. Specifically, it is feasible that the master node schedules the slave nodes to directly merge the results output by the Reduce nodes and combine the results into one file. As the projection databases D' of the K_frequent item sets do not contribute to one another's support counts, different nodes can perform association mining, including the step of pruning, on different projection databases respectively. The results of the association analysis output by the nodes are local frequent item sets with a relatively small data volume. The situation in the conventional art where it is necessary to transmit local candidate frequent item sets with a relatively large data volume obtained by nodes without the step of pruning can be avoided. As such, the transmission overheads are reduced and the efficiency is improved.

Figure 3:
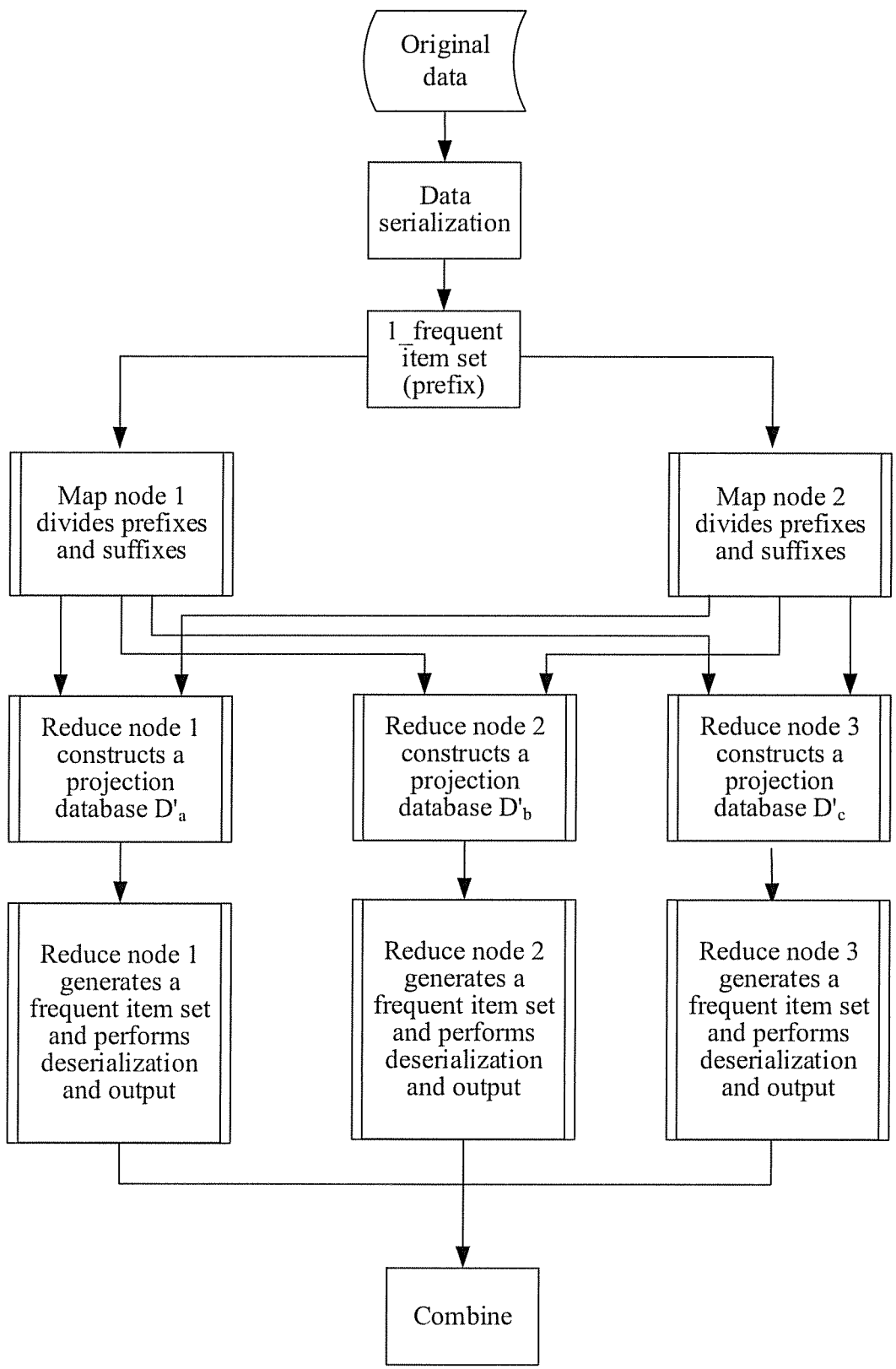
FIG. 3 is a schematic diagram of an execution process of an association analysis method.

To more clearly describe these embodiments, a specific example is provided to describe the method in these embodiments in detail. For example, FIG. 3 is a schematic diagram of an execution process of an association analysis method. As shown in FIG. 3, original data in Table 1 is serialized. In Table 1, each row of the original data corresponds to one user. Column vectors from left to right are user identifiers, operation objects, and operation time points when the operation objects are operated.

TABLE 1

Record table of original data

| User A | Apple, pear, peach | Feb. 1 | Apple, pear, peach | Feb. 2 | Apple, peach | Feb. 3 |
|---|---|---|---|---|---|---|
| User B | Pear, peach | Feb. 3 | Apple | Feb. 4 | Apple, pear | Feb. 5 |
| User C | Apple | Feb. 6 | Pear | Feb. 7 | Banana | Feb. 8 |

The original data in Table 1 records that Users A, B, and C performed three purchasing operations on different days respectively. The following mapping table can be constructed:

Apple→a
Pear→b
Peach→c
Banana→d

According to the above mapping table, a data serialization operation is performed to obtain an original database D. The contents described in the original database D are shown as follows:

abc, abc, ac
bc, a, ab
a, b, d

It is noted that each row represents one transaction. Items are spaced apart by commas in each transaction.

Sequential-pattern association analysis is performed based on the foregoing original database D, and 1_candidate frequent item sets and their support counts are calculated, as shown in the following table.

TABLE 2

1_candidate frequent item sets and their support counts

| Candidate frequent item set | Support count |
|---|---|
| <a> | 3 |
| <b> | 3 |
| <c> | 2 |
| <d> | 1 |

If the support count 2 is preset as a minimum support count threshold, that is, candidate frequent item sets having support counts being less than 2 are filtered out, 1_frequent item sets <a>, <b>, and <c> are obtained.

A part of a projection database of each 1_frequent item set is constructed at each Map node. The Reduce nodes receive a part of a projection database of a corresponding 1_frequent item set from each Map node, combine to obtain the projection databases of the 1_frequent item sets, and perform association analysis.

The 1_frequent item set <a> is taken as a prefix a, and a projection database $D'_a$ of the prefix a is constructed. The constructed projection database $D'_a$ of the prefix a is shown as follows:
_bc, abc, ac
ab
b, d The 1_frequent item set <b> is taken as a prefix b, and a projection database $D'_b$ of the prefix b is constructed. The constructed projection database $D'_b$ of the prefix b is shown as follows:
_c, abc, ac
_c, a, ab
d The 1_frequent item set <c> is taken as a prefix c, and a projection database $D'_c$ of the prefix c is constructed. The constructed projection database $D'_c$ of the prefix c is shown as follows:
abc, ac
a, ab The 1_frequent item sets <a>, <b>, and <c> have been obtained in the foregoing steps. 2_candidate frequent item sets obtained according to the 1_frequent item sets are shown as follows:
<(a, b)>, <(a, c)>, <(b, c)>, <a, a>, <a, b>, <a, c>, <b, a>, <b, b>, <b, c>, <c, a>, <c, b>, <c, c>

It is noted that <(a, b)> indicates that a and b occur at the same time, and <a, b> indicates a occurs first and then b occurs.

Database D has been divided into a projection database $D'_a$ of the prefix a, a projection database $D'_b$ of the prefix b and a projection database D' of the prefix c, on which association analysis is performed by different Reduce nodes respectively. For example, at Reduce node 1, support counts are calculated using projection database $D'_a$ for <(a, b)>, <(a, c)>, <a, a>, <a, b>, <a, c>.

TABLE 3

Calculation results of support counts of Reduce node 1

| Frequent item set | Support count |
|---|---|
| <(a, b)> | 2 |
| <(a, c)> | 1 |
| <a, a> | 2 |
| <a, b> | 3 |
| <a, c> | 1 |

Likewise, Reduce node 2 may only need to calculate support counts based on projection database $D'_b$ for <(b, c)>, <b, a>, <b, b>, <b, c>.

TABLE 4

Calculation results of support counts of Reduce node 2

| Frequent item set | Support count |
|---|---|
| <(b, c)> | 2 |
| <b, a> | 2 |

TABLE 4-continued

Calculation results of support counts of Reduce node 2

| Frequent item set | Support count |
|---|---|
| <b, b> | 2 |
| <b, c> | 1 |

Reduce node 3 may only need to calculate support counts based on projection database $D'_c$ for <c, a>, <c, b>, <c, c>.

TABLE 5

Calculation results of support counts of Reduce node 3

| Frequent item set | Support count |
|---|---|
| <c, a> | 2 |
| <c, b> | 2 |
| <c, c> | 1 |

An identical support count threshold can be set as a screening condition for each of the Reduce nodes. When a support count of a frequent item set is greater than the support count threshold, the frequent item set passes screening and is retained. Otherwise, the frequent item set is screened out and not retained. When the support count threshold is 1, each Reduce node retains the following frequent item sets respectively:

TABLE 6

Screening result of Reduce node 1

| Frequent item set | Support count |
|---|---|
| <(a, b)> | 2 |
| <a, a> | 2 |
| <a, b> | 3 |

TABLE 7

Screening result of Reduce node 2

| Frequent item set | Support count |
|---|---|
| <(b, c)> | 2 |
| <b, a> | 2 |
| <b, b> | 2 |

TABLE 8

Screening result of Reduce node 3

| Frequent item set | Support count |
|---|---|
| <c, a> | 2 |
| <c, b> | 2 |

The Reduce nodes deserialize the frequent item sets after screening according to the mapping tables, and then the Reduce nodes output deserialized results of association analysis. Table 9 schematically shows the deserialized results of association analysis output by the Reduce nodes.

TABLE 9

Results output by the Reduce nodes

| | Frequent item set | Support count |
|---|---|---|
| Reduce node 1 | <(apple, pear)> | 2 |
| | <apple, apple> | 3 |
| | <apple, pear> | 3 |
| Reduce node 2 | <(pear, peach)> | 2 |
| | <pear, apple> | 2 |
| | <pear, pear> | 2 |
| Reduce node 3 | <peach, apple> | 2 |
| | <peach, pear> | 2 |

The results output by the Reduce nodes are combined. The contents of the file obtained by combining is shown as follows:

TABLE 10

Combining result

| Frequent item set | Support count |
|---|---|
| <(apple, pear)> | 2 |
| <apple, apple> | 3 |
| <apple, pear> | 3 |
| <(pear, peach)> | 2 |
| <pear, apple> | 2 |
| <pear, pear> | 2 |
| <peach, apple> | 2 |
| <peach, pear> | 2 |

In these embodiments, after association analysis calculation is performed on an original database to obtain at least two initial item sets, the initial item sets are taken as prefixes to establish projection databases of the prefixes. The nodes perform sequential-pattern association analysis on the corresponding projection databases respectively, and then local frequent item sets and corresponding support counts obtained by the nodes are combined. As the at least two initial item sets do not have an inclusion relation, a projection databases established accordingly do not contribute to a support count of a frequent item set of another projection database. Different nodes can perform association mining, including pruning, on different projection databases respectively. The nodes obtain local frequent item sets with a relatively small data volume. The situation in the conventional art where it is necessary to transmit local candidate frequent item sets with a relatively large data volume obtained by nodes without pruning can be avoided. As such, the transmission overheads are reduced and the efficiency is improved.

Figure 4:
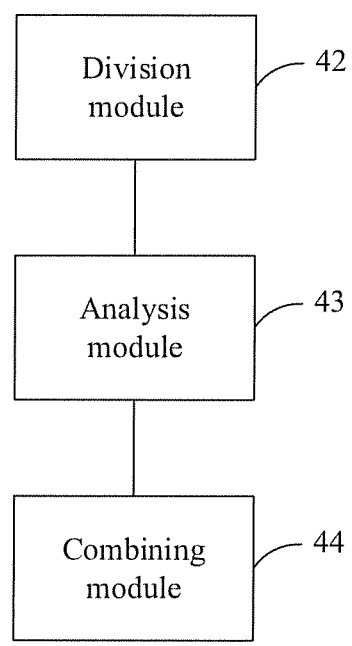
FIG. 4 is a schematic structural diagram of an association analysis apparatus according to embodiments of the present disclosure.

FIG. 4 is a schematic structural diagram of an association analysis apparatus according to some embodiments of the present disclosure. As shown in FIG. 4, the apparatus includes a division module 42, an analysis module 43 and a combining module 44.

Division module 42 is configured to divide an original database into projection databases. A projection database does not contribute to a support count of a frequent item set of another projection database.

Analysis module 43 is configured to perform, by nodes, sequential-pattern association analysis on corresponding projection databases respectively to obtain local frequent item sets and corresponding support counts. Specifically, analysis module 43 is specifically configured to perform, by the nodes, scanning, merging, and pruning steps on the projection databases by using a preset association analysis algorithm to obtain local frequent item sets and corresponding support counts. The association analysis algorithm includes a GSP algorithm.

Combining module 44 is configured to combine the local frequent item sets and the corresponding support counts obtained by the nodes through association analysis to obtain global frequent item sets and corresponding support counts.

Figure 5:
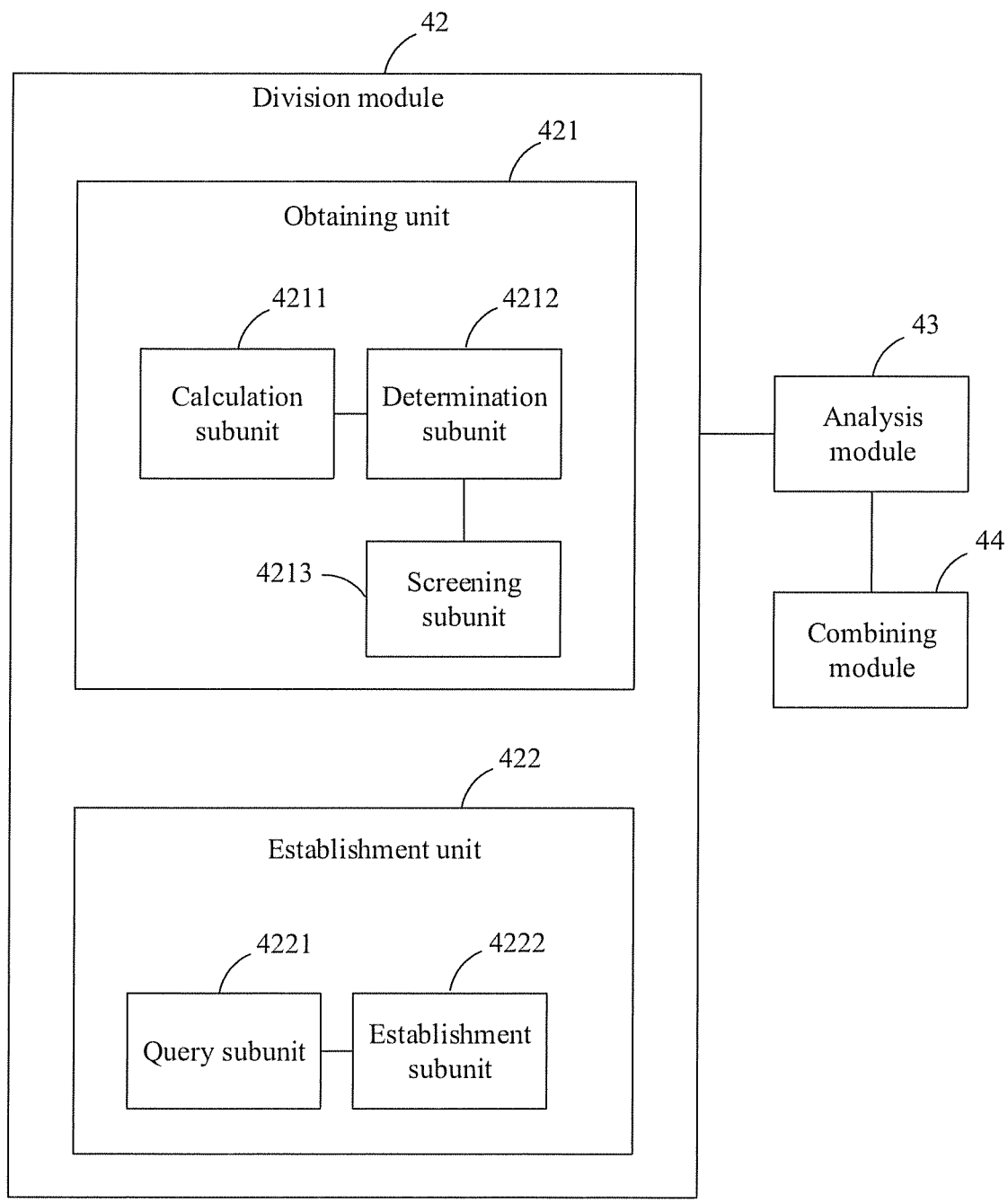
FIG. 5 is a schematic structural diagram of another association analysis apparatus according to some embodiments of the present disclosure.

Further, the embodiments further provide a schematic structural diagram of an association analysis apparatus. FIG. 5 is a schematic structural diagram of another association analysis apparatus according to some embodiments of the present disclosure. As shown in FIG. 5, division module 42 includes an obtaining unit 421 and an establishment unit 422.

Obtaining unit 421 is configured to perform sequential-pattern association analysis on the original database to obtain at least two initial item sets. There is no mutual inclusion relation between the initial item sets.

Establishment unit 422 is configured to take the initial item sets as prefixes to establish projection databases of the prefixes.

Further, in some embodiments, obtaining unit 421 includes a calculation subunit 4211, a determination subunit 4212, and a screening subunit 4213.

Calculation subunit 4211 is configured to calculate k_frequent item sets of the original database, wherein k is a positive integer, and $1 \leq k < N$, N being the number of elements included in the original database.

Determination subunit 4212 is configured to take the k_frequent item sets as the initial item sets.

Screening subunit 4213 is configured to screen the k_frequent item sets according to a preset support count threshold and to retain k_frequent item sets having support counts being greater than the support count threshold.

Further, in some embodiments, establishment unit 422 includes a query subunit 4221 and an establishment subunit 4222.

Query subunit 4221 is configured to take the initial item sets as prefixes to search for suffixes corresponding to the prefixes in transactions of the original database.

Establishment subunit 4222 is configured to combine the suffixes of the transactions to form the projection databases of the prefixes.

In these embodiments, after association analysis calculation is performed on an original database to obtain at least two initial item sets, the initial item sets are taken as prefixes to establish projection databases of the prefixes. The nodes perform sequential-pattern association analysis on the corresponding projection databases respectively. As the at least two initial item sets have no mutual inclusion relation, a projection database established accordingly does not contribute to a support count of a frequent item set of another projection database. Different nodes can perform association mining, including pruning, on different projection databases respectively. The nodes obtain local frequent item sets with a relatively small data volume. The situation in the conventional art where it is necessary to transmit local candidate frequent item sets with a relatively large data volume obtained by nodes without pruning can be avoided. As such, the transmission overheads are reduced and the efficiency is improved.

Figure 6:
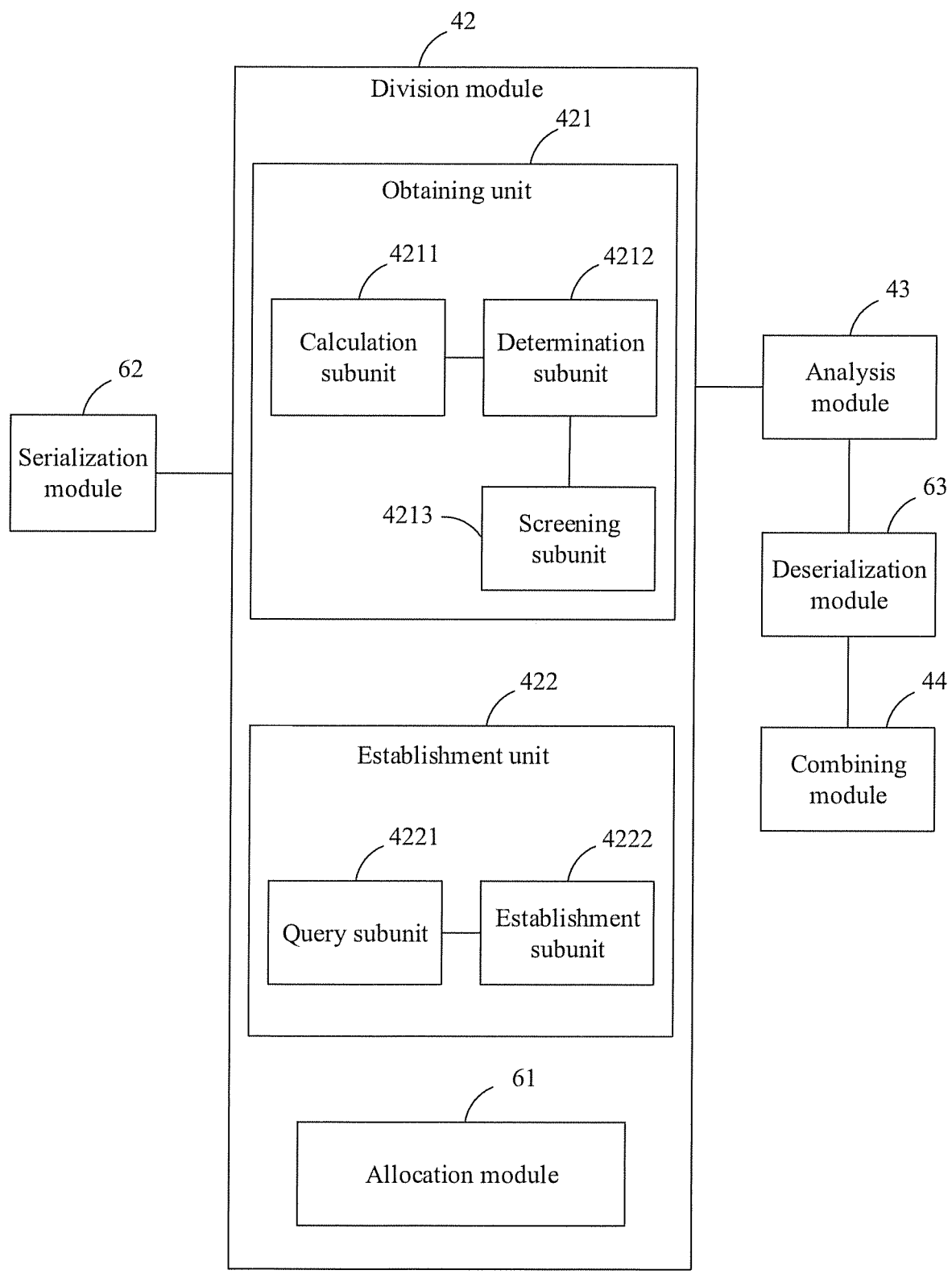
FIG. 6 is a schematic structural diagram of an association analysis apparatus according to some embodiments of the present disclosure.

FIG. 6 is a schematic structural diagram of an association analysis apparatus according to some embodiments of the present disclosure. On the basis of the previous embodiments, the apparatus in these embodiments further includes an allocation module 61.

Allocation module 61 is configured to allocate nodes having load capacities matching data volumes of the projection databases to the projection databases.

Further, the association analysis apparatus further includes a serialization module 62 and a deserialization module 63.

Serialization module 62 is configured to serialize original data according to a mapping table to obtain the original database.

Deserialization module 63 is configured to deserialize the local frequent item sets before the local frequent item sets and the corresponding support counts obtained by the nodes through association analysis are combined. Alternatively, deserialization module 63 can be configured to deserialize global frequent item sets after the global frequent item sets and corresponding support counts are obtained.

In these embodiments, after association analysis calculation is performed on an original database to obtain at least two initial item sets, the initial item sets are taken as prefixes to establish projection databases of the prefixes. The nodes perform sequential-pattern association analysis on the corresponding projection databases respectively. As the at least two initial item sets have no mutual inclusion relation, a projection database established accordingly does not contribute to a support count of a frequent item set of another projection database. Different nodes can perform association mining, including the step of pruning, on different projection databases respectively. Nodes obtain local frequent item sets with a relatively small data volume. The situation in the conventional art where it is necessary to transmit local candidate frequent item sets with a relatively large data volume obtained by nodes without the step of pruning can be avoided. As such, the transmission overheads are reduced and the efficiency is improved. In addition, because the projection databases may have different scales, nodes having load capacities matching data volumes of the projection databases are allocated to the projection databases. The situation where some nodes are idle while some other nodes are overloaded can be avoided, thus further improving the efficiency of association analysis.

Those of ordinary skill in the art can understand that implementation of all or some of steps in the above method embodiments may be completed by a program instructing relevant hardware. The program may be stored in a computer readable storage medium. When the program is executed, the steps included in the above method embodiments are performed. The foregoing storage medium includes any medium that can store a program code, such as a Read-Only Memory (ROM), a Random Access Memory (RAM), cloud storage, a magnetic disk, or an optical disc. The storage medium can be a non-transitory computer readable medium. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM any other memory chip or cartridge, and networked versions of the same.

Finally, it is noted that the above embodiments are merely provided for describing the technical solutions of the present invention, and not intended to limit the present invention. It is understood by those of ordinary skill in the art that although the present disclosure has been described in detail with reference to the foregoing embodiments, modifications can be made to the technical solutions described in the foregoing embodiments, or equivalent replacements can be made to some or all technical features in the technical solutions, while such modifications or replacements do not cause the essence of corresponding technical solutions to depart from the spirit and scope of the present invention.

I claim:

1. An association analysis method, comprising:
   determining at least two frequent item sets of an original database, wherein there is no mutual inclusion relation between the at least two frequent item sets;
   dividing the original database into projection databases, one of the projection databases not contributing to a support count of a frequent item set of another of the projection databases, wherein the projection databases are established by taking the at least two frequent item sets as prefixes and nodes corresponding to the projection databases are configured to obtain local frequent item sets and corresponding support counts respectively; and
   combining the local frequent item sets and the corresponding support counts obtained by the nodes through the association analysis to obtain global frequent item sets and corresponding support counts.

2. The association analysis method according to claim 1, wherein determining at least two frequent item sets of an original database comprises:
   determining K_frequent item sets of the original database, wherein K is a positive integer, and $1 \leq K < N$, N being the number of elements included in the original database.

3. The association analysis method according to claim 2, further comprising:
   screening the K_frequent item sets according to a preset support count threshold, and retaining K_frequent item sets having support counts being greater than the support count threshold.

4. The association analysis method according to claim 1, wherein dividing the original database into projection database, one of the projection databases not contributing to the support count of the frequent item set of another of the projection databases comprises:
   taking the at least two frequent item sets as prefixes to search for suffixes corresponding to the prefixes in transactions of the original database; and
   combining the suffixes of the transactions to form the projection databases of the prefixes.

5. The association analysis method according to claim 1, further comprises:
   allocating nodes having load capacities supporting data volumes of the projection databases to the projection databases.

6. The association analysis method according to claim 1, further comprises:
   performing, by the nodes, scanning, merging, and pruning on the projection databases by using a preset association analysis algorithm to obtain local frequent item sets and corresponding support counts.

7. The association analysis method according to claim 1, further comprises:
   serializing original data according to a mapping table to obtain the original database.

8. The association analysis method according to claim 7, further comprising:
   deserializing the global frequent item sets after the global frequent item sets and corresponding support counts are obtained.

9. The association analysis method according to claim 7, wherein the local frequent item sets are deserialized before the local frequent item sets and the corresponding support counts obtained by the nodes through the association analysis are combined.

10. An association analysis apparatus, comprising:
one or more memories configured to store executable program code; and
one or more processors configured to read the executable program code stored in the one or more memories to cause the association analysis apparatus to perform:
determining at least two frequent item sets of an original database, wherein there is no mutual inclusion relation between the at least two frequent item sets;
dividing the original database into projection databases, one of the projection databases not contributing to a support count of a frequent item set of another of the projection databases, wherein the projection databases are established by taking the at least two frequent item sets as prefixes and nodes corresponding to the projection databases are configured to obtain local frequent item sets and corresponding support counts respectively; and
combining the local frequent item sets and the corresponding support counts obtained by the nodes through the association analysis to obtain global frequent item sets and corresponding support counts.

11. The association analysis apparatus according to claim 10, wherein determining at least two frequent item sets of an original database comprises:
determining K_frequent item sets of the original database, wherein K is a positive integer, and 1≤K<N, N being the number of elements included in the original database.

12. The association analysis apparatus according to claim 11, wherein the one or more processors are configured to read the executable program code to cause the association analysis apparatus to further perform:
screening the K_frequent item sets according to a preset support count threshold and retaining K_frequent item sets having support counts being greater than the support count threshold.

13. The association analysis apparatus according to claim 10, wherein dividing the original database into projection database, one of the projection databases not contributing to the support count of the frequent item set of another of the projection databases comprises:

taking the at least two frequent item sets as prefixes to search for suffixes corresponding to the prefixes in transactions of the original database; and
combining the suffixes of the transactions to form the projection databases of the prefixes.

14. The association analysis apparatus according to claim 10, wherein the one or more processors are configured to read the executable program code to cause the association analysis apparatus to further perform:
allocating nodes having load capacities supporting data volumes of the projection databases to the projection databases.

15. The association analysis apparatus according to claim 10, wherein the one or more processors are configured to read the executable program code to cause the association analysis apparatus to further perform:
performing, by the nodes, scanning, merging, and pruning on the projection databases by using a preset association analysis algorithm to obtain local frequent item sets and corresponding support counts.

16. A non-transitory computer-readable storage medium storing a set of instructions that is executable by one or more processors of one or more electronic devices to cause the one or more electronic devices to perform a method comprising:
determining at least two frequent item sets of an original database, wherein there is no mutual inclusion relation between the at least two frequent item sets;
dividing the original database into projection databases, one of the projection databases not contributing to a support count of a frequent item set of another of the projection databases, wherein the projection databases are established by taking the at least two frequent item sets as prefixes and nodes corresponding to the projection databases are configured to obtain local frequent item sets and corresponding support counts respectively; and
combining the local frequent item sets and the corresponding support counts obtained by the nodes through the association analysis to obtain global frequent item sets and corresponding support counts.

17. The non-transitory computer-readable storage medium of claim 16, wherein determining at least two frequent item sets of an original database comprises:
determining K_frequent item sets of the original database, wherein K is a positive integer, and 1≤K<N, N being the number of elements included in the original database.

* * * * *